(12) United States Patent
Brown

(10) Patent No.: US 9,773,218 B2
(45) Date of Patent: Sep. 26, 2017

(54) SEGMENTED BUSINESS PROCESS ENGINE

(71) Applicant: Red Hat, Inc., Raleigh, NC (US)

(72) Inventor: Gary Peter Brown, Hitchin (GB)

(73) Assignee: Red Hat, Inc., Raleigh, NC (US)

( * ) Notice: Subject to any disclaimer, the term of this patent is extended or adjusted under 35 U.S.C. 154(b) by 855 days.

(21) Appl. No.: 13/954,308

(22) Filed: Jul. 30, 2013

(65) Prior Publication Data

US 2015/0039379 A1    Feb. 5, 2015

(51) Int. Cl.
*G06Q 10/06*    (2012.01)

(52) U.S. Cl.
CPC .............................. *G06Q 10/06316* (2013.01)

(58) Field of Classification Search
None
See application file for complete search history.

(56) References Cited

U.S. PATENT DOCUMENTS

| | | | |
|---|---|---|---|
| 6,892,192 B1 | 5/2005 | Geddes et al. | |
| 7,373,361 B2 | 5/2008 | Monroe et al. | |
| 7,685,577 B2 | 3/2010 | Pace et al. | |
| 8,214,325 B2 | 7/2012 | Navas | |
| 8,276,115 B2 | 9/2012 | Bates et al. | |
| 2010/0318637 A1* | 12/2010 | Ly | G06F 9/5083 709/221 |
| 2011/0077999 A1* | 3/2011 | Becker | G06Q 10/10 705/7.35 |
| 2011/0138007 A1 | 6/2011 | Nomura | |
| 2011/0179046 A1* | 7/2011 | Paull | G06Q 10/06 707/754 |
| 2012/0278815 A1* | 11/2012 | Balko | G06F 9/5055 719/313 |
| 2013/0007767 A1* | 1/2013 | Leming | G06F 8/73 719/314 |
| 2013/0347004 A1* | 12/2013 | Day | G06F 9/546 719/313 |

OTHER PUBLICATIONS

Sun, SEDA4BPEL A Staged Event-Driven Architecture for High-Concurrency BPEL Engine.pdf, 978-1-4244-7755-5/10/ 2010 IEEE, pp. 744-749.
Chen, Developing a Concurrent Service Orchestration Engine Based on Event-Driven Architeture.pdf, R. Meersman and Z. Tad (Eds.): OTM 2008, Part I, LNCS 5331, pp. 675-690, 2008.

* cited by examiner

*Primary Examiner* — Thomas L Mansfield, Jr.
(74) *Attorney, Agent, or Firm* — Lowenstein Sandler LLP

(57) ABSTRACT

A method and system for providing a segmented business process engine for generating a result in response to an event message. A process instance identification component of the segmented business process engine identifies a process instance associated with the event message and provides the process instance message to a selected process execution component of the segmented business process engine. The selected process execution component identifies a process definition in view of the process instance message and obtains state information associated with the event from a consistent image store component of the segmented business process engine. The selected process execution component generates a result associated with the event in view of the state information and the process definition and provides the result to at least one of the client application or another process instance identification component.

14 Claims, 4 Drawing Sheets

SEGMENTED BUSINESS PROCESS ENGINE

TECHNICAL FIELD

Embodiments of the present disclosure relate to a distributed computing system, and more specifically, to a segmented, scalable and distributed business process engine.

BACKGROUND

Business process engines are traditionally arranged as heavy weight systems which receive events from a business process client and perform various related actions. The activities performed by a conventional business process engine (e.g., receiving and interpreting the initial event, classifying the event to determine a relevant process definition and instance, performing associated actions and updating any state changes) are performed in atomic transactions with state information persisted in a central database. In order to scale these systems, additional business process engines are added which use the same central database or the business process clients are artificially segmented and assigned to use a particular business process engine and associated central database.

DETAILED DESCRIPTION

Figure 1:
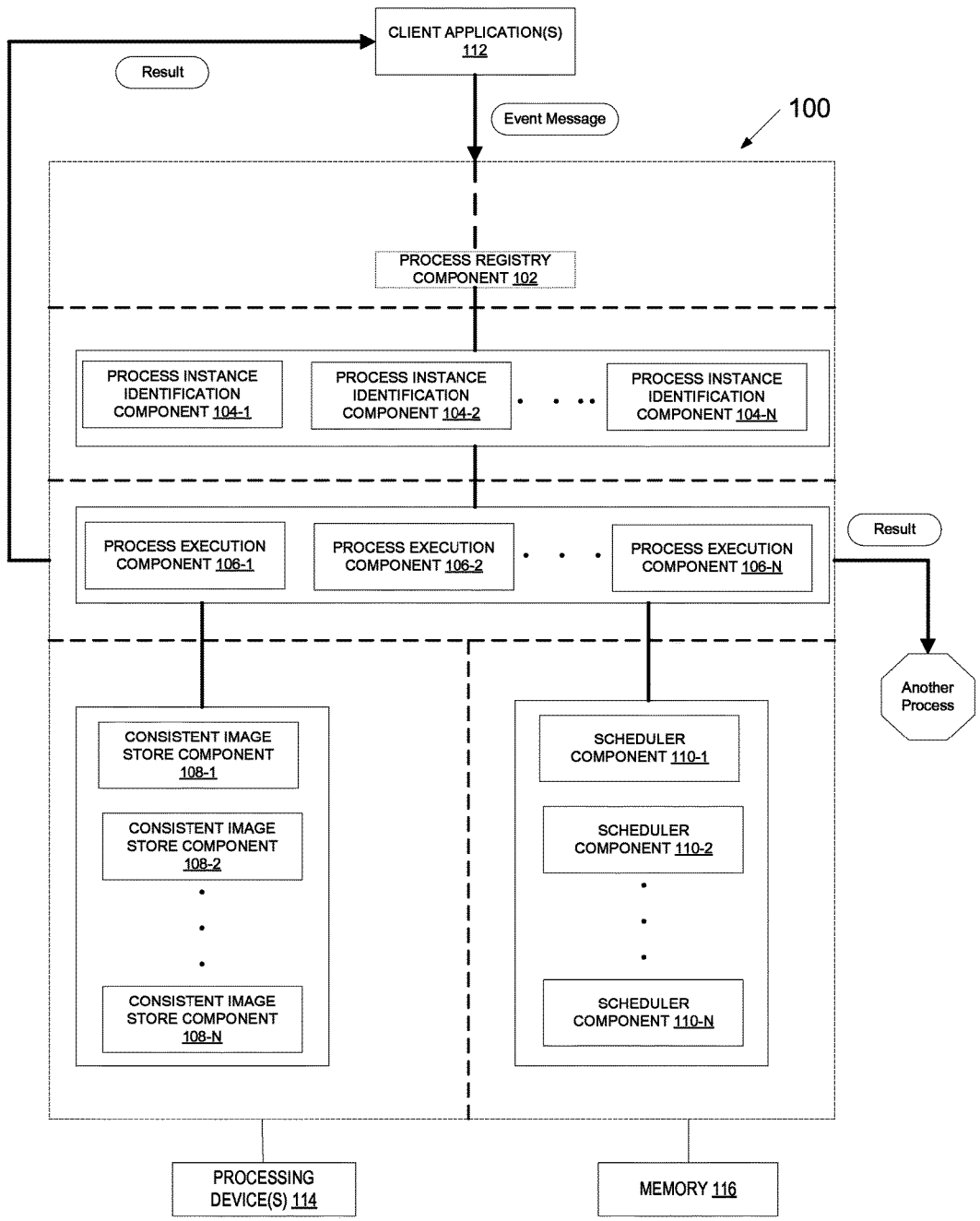
FIG. 1 is a block diagram of an example business process engine system including distributed and scalable components, according to aspects of the present disclosure.

In a distributed computing system, it may be desired to employ a business engine in order to perform an event (e.g., an activity relating to the execution of a business transaction). In a conventional system, the business engine includes multiple components within a closed system which cooperate in order to perform the given event. In this regard, the multiple components of the monolithic business engine perform atomic instructions and rely on a central database in order to perform the expected actions and maintain the associated state information, and the centralized arrangement of the business engine lacks scalability and asynchronicity.

The present disclosure relates to methods and systems that provide for a highly scalable, asynchronous business process engine wherein the components of the business process engine are decomposed into one or more sets of separate and distributed components that employ asynchronous communications for inter-component interaction. Advantageously, the distributed component arrangement of the business process engine in accordance with the methods and systems of the present disclosure allow for the respective component layers to be scaled up for increased efficiency and production. Moreover, the segmented component layers of the business engine enable the implementation of segmentation policies to further scale the business engine event processing, without the business process clients (e.g., client applications) being aware of the decomposed nature of the business process engine.

According to aspects of the present disclosure, a segmented business process engine is provided for receiving events (e.g., messages or other communication) from a source (herein referred to as a "client application") and performing related activities associated with the event using multiple, distributed component layers. Exemplary activities performed by the segmented business process engine include, but are not limited to, receiving and interpreting an initial event, classifying the event to determine an applicable business process definition and instance, performing the appropriate actions relating to the event and updating any change in state information. The component layers may include one or more components configured to perform particular actions, tasks, and/or functions as part of the business process engine, such as, for example, a process registry component, a process instance identification component, a process execution component, a consistent image store component, and a scheduler component.

Each component layer is configured to perform certain functions to contribute to the overall processing performed by the business process engine. Advantageously, the segmented component layers of the business process engine may employ a scalable asynchronous execution platform, such as, for example, a Vert.x platform. The multiple component layers of the distributed business process engine perform tasks and communicate with one another to achieve performance of the activities associated with an event initiated by a client application.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example computing environment including a segmented business process engine 100 in communication with one or more client applications 112. The segmented business process engine 100 may run on one or more server machines in communication with one or more client devices running the one or more client applications 112. The client applications 112 may communicate with the business process engine 100 via any suitable method, including via a network (e.g., a public network such as the Internet, a private network such as a local area network (LAN), or a virtual private network (VPN)). The business process engine 100 includes multiple segmented component layers configured to communicate with one another via inter-component messaging. In the example shown in FIG. 1, the business process engine 100 includes segmented component layers including one or more of the following components: a process registry component 102, a process instance identification component 104, a process execution component 106, a consistent image store component 108, and a scheduler component 110. As shown, the multiple component layers are denoted by dashed lines demonstrating the segmented arrangement of the layers. In this regard, the various component layers may reside on different computing devices and may be physically or virtually located in any number of different locations. Accordingly, any desired distributed arrangement of the component layers may be achieved, wherein each component layer may include one or more of the associated component. For example, as shown in FIG. 1, a process instance identification component layer may include multiple process instance identification components (e.g., process instance identification components 104-1, 104-2, . . . 104-N).

The segmented business process engine 100 and its multiple component layers may be executed by a computing environment including one or more processing devices 114 coupled to one or more memory locations 116 (e.g., storage including volatile memory devices (e.g., random access memory (RAM)), non-volatile memory devices (e.g., flash memory), a magnetic hard disk, a Universal Serial Bus (USB) solid state drive, etc., a local disk, an external disk, and/or other types of memory devices) in a distributed arrangement.

In an embodiment, the process registry component 102, the process instance identification component 104, the process execution component 106, the consistent image store component 108, and the scheduler component 110 include software components (e.g., a set of instructions residing in one or more memories 116) executable by the one or more processing devices (e.g., processing devices 114) which perform the activities of the business process engine to generate a result associated with an event message received from a client application 112. An event message may identify an event such as a purchase order, an auction bid, etc. As shown in FIG. 1, the result produced by the segmented business process engine 100 may be provided to the client application 112 which initiated the event message or provided to another process (e.g., another business process engine).

In one example, each component layer (e.g., 102, 104, 106, 108, and 110) resides on one or more separate machines. In another example, at least some of the component layers may be hosted by the same machine. The component layers are configured to perform one or more activities or tasks (also referred to as "component activity") relating to the one or more event messages received from the client application 112. The component layers further execute messages or communications with one another relating to the execution of related activities and production of the result (also referred to as "inter-component messages"). As denoted by the dashed lines, according to aspects of the present disclosure, the process registry component 102 may be an optional component of the business process engine 100.

According to an aspect of the present disclosure, a management component (not shown) may be employed to perform management functions relating to the distributed and segmented component layers of the business process engine 100. For example, the management component may be configured to manage the scalability and performance aspects of the segmented business process engine 100 by dynamically re-configuring the platform to re-partition the management of the multiple process instances and establish suitable routing policies to direct future events to the appropriate location. For example, a company may introduce a premium level service, and therefore employ a routing policy that identifies requests from premium customers and routes those requests to a larger number of higher powered machines when handling the execution of the request. In an embodiment, when a new policy is introduced, prior to it "going live", any existing active process instance may need to be relocated to ensure subsequent requests are routed to the correct process instance.

Figure 2:
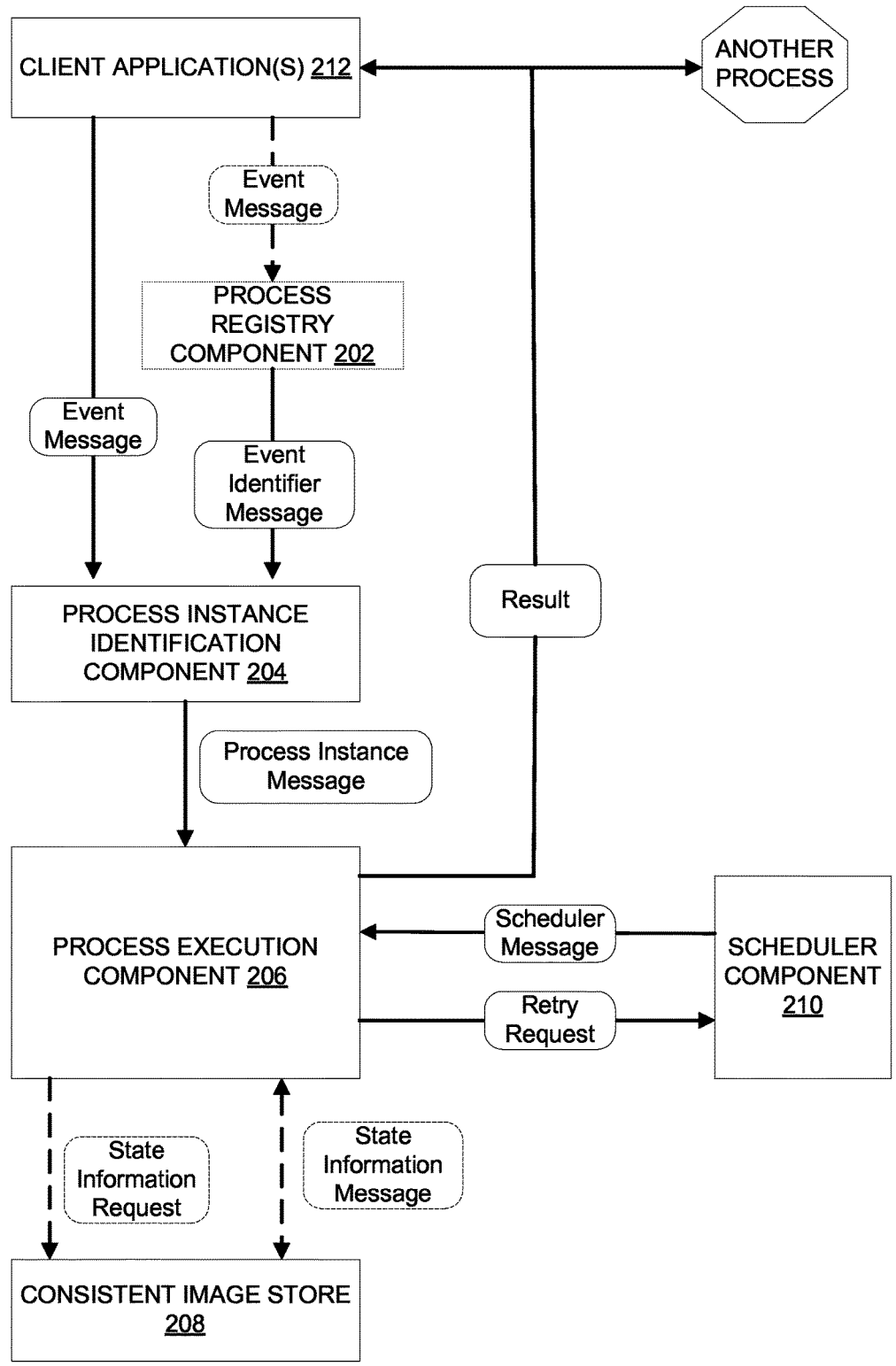
FIG. 2 is a block diagram of an example flow of messages among distributed components of a business process engine system, according to aspects of the present disclosure.

FIG. 2 is a block diagram illustrating a communication framework illustrating exemplary inter-component messages between component layers (e.g., component layers 102-110 of FIG. 1) of a segmented business process engine (e.g., business process engine 100 of FIG. 1). As shown in FIG. 2, a client application 212 provides an event message relating to an event for processing by a business process engine. In an embodiment, the business process engine includes a process registry component 202 configured to receive the event message. The process registry component 202 is configured to route the incoming event message to an appropriate process instance identification component 204 along with an associated process definition for processing the event. Based on the event message, the process registry component 202 generates an event identifier message for provisioning to the process instance identification component 204. The event identifier message includes information associated with the event message (i.e., the original event information), an identification of the event's type and a target process definition identifier (e.g., a target process definition name).

In an embodiment, the process registry 202 provides a service interface (using WSDL, for example) to the client application 212, and then routes the event message sent to that service to the process identification component 204, associating the process definition identifier with the routed message. Advantageously, the process registry 202 acts as a service façade or interface around the process definition, for use by the client applications 212.

In an embodiment, the event identifier message may be sent by the process registry component 202 to a single process instance identification component or one of many process instance identification components in accordance with a suitable routing algorithm (e.g., a routing algorithm based on routing parameters such as the requesting client application's user, location, etc.). In an embodiment, for increased scaling, multiple different segments of process instance identification components may be maintained to allow the event identifier message to be routed to the different segments in order to achieve load balancing or routing based on routing parameters such as the event message information (e.g., the client application's type, location, priority level, etc.). As shown in FIG. 2, if the business process engine does not include a process registry component, the event message may be sent by the client application 212 to the process instance identification component for further processing.

Upon receipt of the event identifier message (or event message), the process instance identification component 204 is configured to identify a process instance to which the event should be routed. In an embodiment, a process instance includes an instantiation of a particular process definition. For example, if the event relates to a purchasing process definition for an order having an order number of XYZ-123, then a process instance is created (or identified) as process instance XYZ-123. Another event relating to purchase order XYZ-124 may result in the creation (or identification) of an associated process instance of XYZ-124, and so on.

In an embodiment, if an event associated with a purchase order is received, the event is identified as having an event type of "Purchase Order", the event is associated with a "Purchasing" process definition. The order identifier (i.e., the order ID) may be extracted from the Purchase Order message and used as a correlation identifier (i.e., the correlation ID) to locate the appropriate process instance identifier. In an embodiment, if a process instance identifier does not already exist for that correlation ID and/or order ID, then a new process instance identifier is created along with a new instance of the process definition. If the order ID already relates to an existing process instance identifier (and existing process instance), then the event message is routed to that process instance.

In an embodiment, more than one correlation ID may be associated with the same process instance identifier. For example, a process may initially be instantiated using the order ID, but during the process, a 'delivery ID' may be associated with the same process instance identifier, and from that point forward, any event messages using the particular 'delivery ID' are also routed to that same process instance.

The process instance identification component 204 checks the incoming message in order to extract process instance information for association with a correlation identifier in accordance with the applicable process definition language (e.g., BPMN2, WS-BPEL, etc.). If the process instance information is not available, the process instance identification component 204 treats the incoming message as being associated with a newly instantiated process instance, and generates a new process instance identifier.

Upon identifying the process instance (or generating a new process instance), the process instance identification component 204 generates a process instance message for provisioning to a process execution component 206. According to an aspect of the present disclosure, the process instance message includes event information (e.g., the information from the event message), the event type information, the process definition identifier, and the process instance identifier (in some cases, including an indication that the process instance identifier is a newly generated process instance). In an embodiment, for increased scaling, multiple different segments of process execution components 206 may be maintained to allow the process instance message to be routed to the different segments in order to achieve load balancing or routing based on the process instance message information (e.g., the client application's type, location, priority level, process instance state, process instance identifier, etc.).

Upon receipt of the process instance message, the process execution component 206 is configured to retrieve an executable representation of the identified process definition and current state information for the identified process instance (e.g., executable representations in any suitable language, such as BPMN2, WS-BPEL, Java, C#, Javascript, etc.). In an embodiment, the process definition represents the one or more activities that are to be performed in order to achieve an associated goal, result, or outcome (e.g., a business goal). The current state information may include, for example, the current execution status or position in the process definition, along with values that have been assigned to variables that are being used by the process instance.

In an embodiment, for new process instances, state information is not retrieved, but instead the state information is initialized from the process definition. In an embodiment, when appropriate (as denoted by the dashed lines in FIG. 2), the process execution component 206 retrieves the current state information by sending a state information request to a consistent image store component 208. In response, the consistent image store component 208 sends a state information message including the current state information to the process execution component.

In an embodiment, following processing of the event by the process execution component resulting in a change of the state information, the process execution component provides the updated state information to the consistent image store component 208 via a state information message.

Following completion of the processing of the event by the process execution component, the corresponding result or outcome may be provided back to the client application 212 that initiated the event request or to another process, as shown in FIG. 2. If the result is provided to another process (e.g., another service), the result message may be sent to the appropriate destination with optional "reply to" metadata identifying the originating process instance to allow the response to be handled either directly (e.g., using a specific temporary destination) or indirectly (via an appropriate process instance identification component, process execution component, and consistent image store component). In an embodiment, the "reply to" information provides the details of where the reply message should be sent. In an embodiment, if the executing process instances are co-located in the same execution environment, then the response may be returned directly to the originating process instance. If, for example, the executing process instances are distributed, then the reply may be exchanged with the other process instance via the scalable component layers, as described above.

In an embodiment, when a process instance completes, the associated state information is removed from the consistent image store component 208 and a notification or instruction is sent by the consistent image store component to the process instance identification component 204 to remove information relating to the process instance.

In an embodiment, routing of events to a process execution component of the process execution component layer including multiple process execution components is based on the process instance state. As such, the process engine component and the execution of the process definition may be distributed. For example, a first process execution component (or first cluster of related process execution components) may be responsible for executing a first state of an example process definition (referred to as "process definition X"), while a second process execution component (or second cluster of related process execution components) is responsible for the execution of a second state of the process definition X. Advantageously, the execution of the multiple instances of process definition X may be tuned at a fine level of granularity to ensure enough resources are available for execution of the relevant portions of the process definition.

In an embodiment, for increased scaling, multiple different segments of the consistent image store component 208 and scheduler component 210 may be maintained to allow the messages from the process execution component 206 (e.g., the state information request, state information message, scheduler message, retry request, etc.) to be routed to the different segments in order to achieve load balancing or routing based on factors, such as, for example, the requesting client application's 212 user, the client application's location, the client application's type, the event priority level, the process instance state, process instance identifier, the type of process execution component 206, the process execution component's 206 location, a priority level associated with the process execution component 206, etc.).

In an embodiment, the consistent image store component 208 is configured to maintain state information following a determination that no contention occurred. When an image (e.g., a snapshot of the current process state) is initially stored by the consistent image store component 208, the image is associated with identifying information (e.g., a version identifier and/or a timestamp). In an embodiment, the image represents the binary representation of state that can be loaded quickly. When a modified version of the image (or process state) is stored, the consistent image store component 208 performs a check to determine whether the current persisted version/timestamp is the same as the one upon which the modified image was based. If the identifying information is the same, then the consistent image store component 208 stores the modified image with new identifying information (e.g., a new version and/or timestamp). If the consistent image store component 208 determines that the identifying information is not the same, then the consistent image store component 208 identifies the failure and does not store the modified image.

In an embodiment, if an attempt to store a modified image fails, the process execution component 206 may send a retry request to the scheduler component 210 to cause the modifications to be retried based on the newer version of the image. The scheduler component 210 may provide a scheduler message to the process execution component 206 to enable the modification to be retried. After the modifications are retried, the process execution component 206 may make a subsequent attempt to have the modified image stored by the consistent image store component 208. In an embodiment, the process execution component 206 and the scheduler component 210 may continue to attempt to retry to execute the process that caused the modifications until a retry threshold is reached. In an embodiment, if the number of attempts to retry exceeds the retry threshold, the overall task (process execution) fails.

In an embodiment, the scheduler component layer may include multiple scheduler components 210 configured to perform scheduling for the process execution components 206 of the process execution component layer. For example, the scheduler component layer, also a scalable layer wherein multiple scheduler components 210 may be added, may implement capabilities in the process definition language (e.g., a wait construct command), cause a timeout if an event has not occurred within a particular timeframe, and/or support engine level functionality such as the modification retry described above.

In an embodiment, the scheduler component 210 may be informed of a task that requires performance and a time that the task is to be performed. If the task is triggered, the details of what is to be performed are encoded in the configured task (e.g., handling an event retry). In an embodiment, the scheduler component 210 may cancel a task (e.g., if a pending situation occurs and the timeout threshold is no longer applicable).

Figure 3:
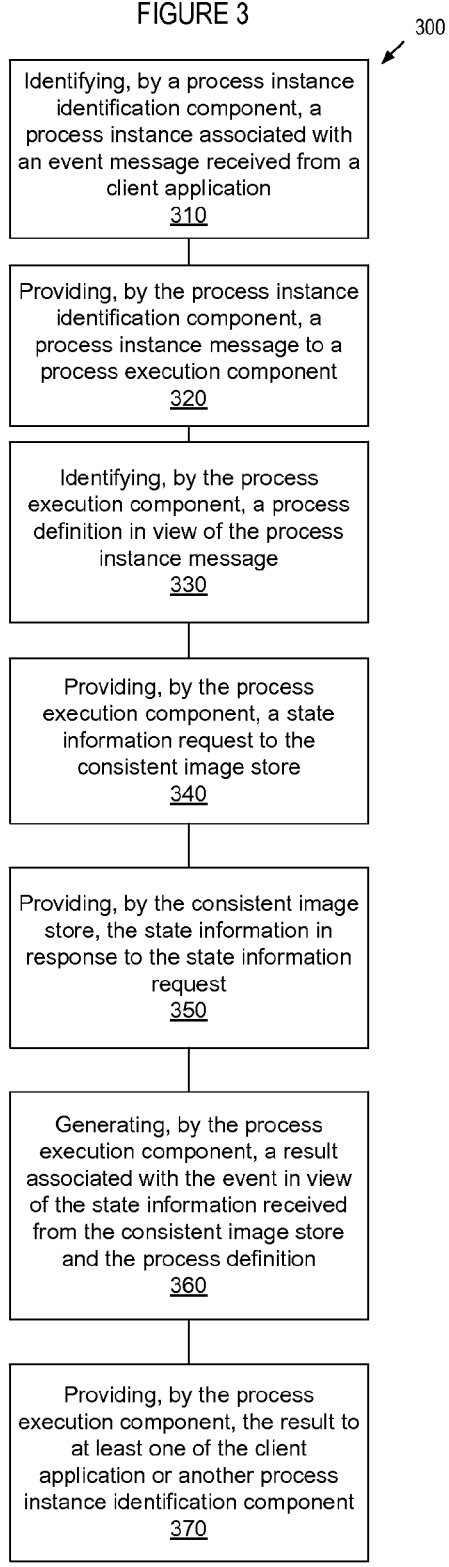
FIG. 3 is a flow diagram of an example method for managing an event by a distributed business process engine, according to aspects of the present disclosure.

FIG. 3 is a flow diagram illustrating an example of a method 300 relating to the operation of a segmented business process engine (e.g., the business process engine 100 of FIG. 1) including segmented components (or component layers including multiple components) configured to inter-operate to generate a result in response to an event message received from a client application. In an example, the method 300 may be performed by a segmented business process engine 100 of FIG. 1 and/or a computer system 400 of FIG. 4 that may include hardware (e.g., circuitry, dedicated logic, programmable logic, microcode, etc.), software (e.g., instructions run on a processing device), or a combination thereof, wherein the various components/component layers of the business process engine are segmented and distributed.

In block 310, a process instance identification component of the segmented business process engine identifies a process instance associated with an event received from a client application. In an embodiment, the event may be received by the process instance identification component from a process registry or directly from the client application. In an embodiment, the process instance may be identified by extracting event information from the event message and correlating the information (e.g., a correlation identifier) with an appropriate process instance. In an embodiment, if the information identified in the event message for correlation purposes does not match any existing process instance identifier, then a new process instance is instantiated.

In block 320, having identified the process instance, the process instance identification component provides a process instance message to a process execution component. In an embodiment, the process instance message includes a process instance identifier (including, in some cases, an indication that the process instance is new) and, optionally, one or more of the event information, an event type, a process definition identifier (e.g., a process definition name).

In view of the process instance message, the process execution component identifies a process definition, in block 330. In block 340, the process execution component further provides a state information request to a consistent image store component in order to obtain the appropriate state information associated with the identified process instance. In response to the state information request, the consistent image store component identifies the appropriate state information, and in block 350, provides the state information to the process execution component.

Having received the state information from the consistent image store component, the process execution component generates a result associated with the event in view of the state information and the process definition, in block 360. The generated result may then be provided to the client application that initiated the event request and/or another process (e.g., another process instance identification component associated with another segmented business process engine), in block 370.

Advantageously, each of the segmented component layers of the business process engine may be scaled to include multiple components. In addition, the multiple components of each component layer may be distributed to leverage scalable asynchronous execution platforms, such as the Vert.x platform. According to an aspect of the present disclosure, the inter-component messaging framework described in connection with FIGS. 2 and 3 allows for scalability of the functional layers of the segmented business process engine, without the limitations associated with conventional monolithic business process engines.

In method 300, as described above in connection with FIG. 2, the routing of the inter-component messaging may be performed in a manner as to optimize the performance of the segmented business engine. For example, routing algorithms may be employed which consider suitable factors (e.g., a client application's location, an event type, load-balancing considerations including a current load on the components of a component layer, the event requester (or user of the client application), a priority level associated with the event, etc.) when determining which of the multiple components in a component layer to send the inter-component message.

Figure 4:
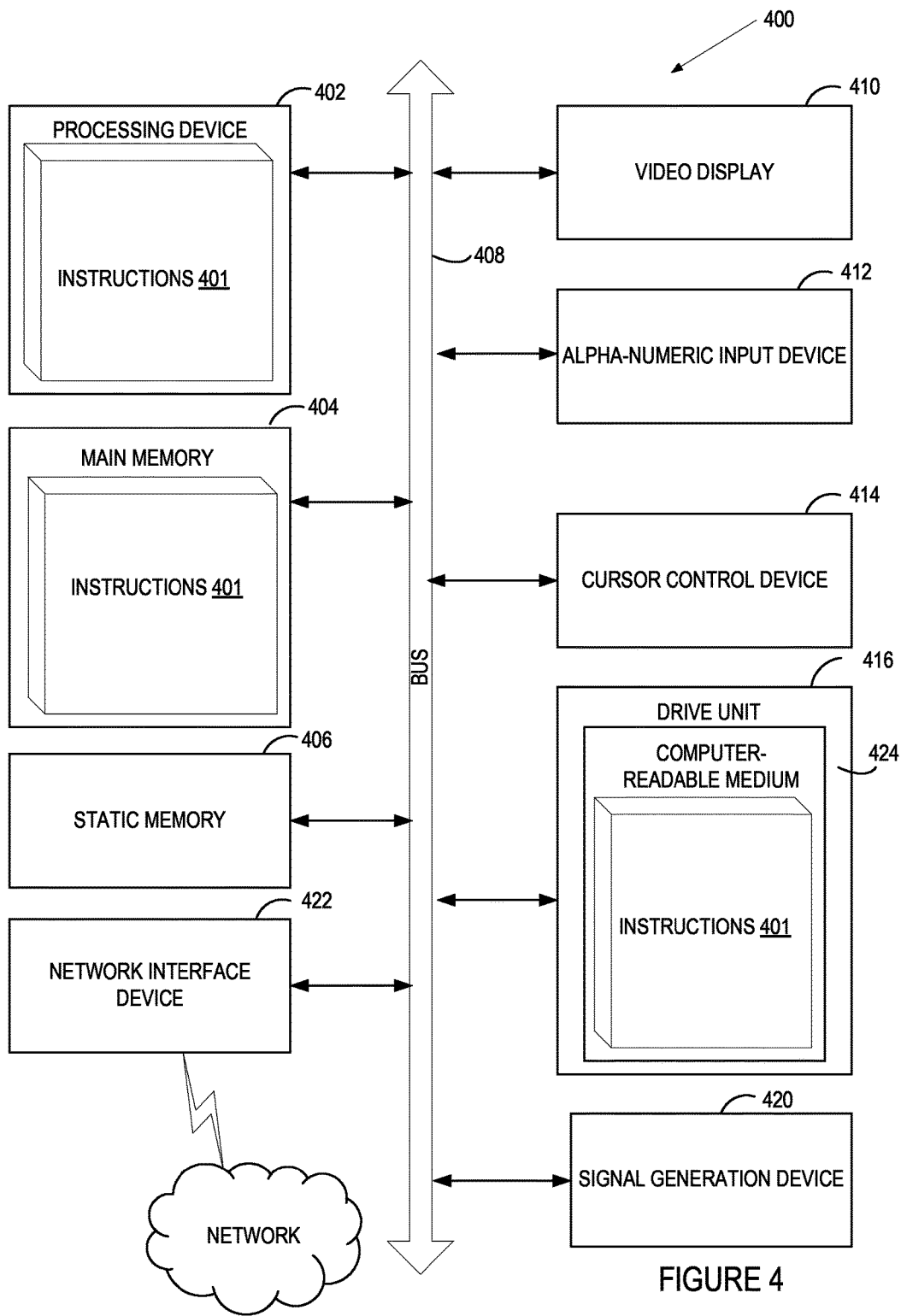
FIG. 4 illustrates a diagrammatic representation of a business process engine, according to aspects of the present disclosure.

FIG. 4 illustrates an example computer system within which a set of instructions 401, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. According to an aspect of the present disclosure, due to the segmented and distributed architecture of the business process engine, the illustrative computer system 400 may be composed of multiple different computer systems configured to execute at least a portion of the instructions 401 associated with a component or component layer of the segmented business process engine.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processing device 402 (e.g., a processor) represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 401 for performing the operations discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 for storing the instructions 401 (e.g., instructions corresponding to the method of FIG. 3) embodying any one or more of the methodologies or functions described herein. The instructions 401 may also reside, completely or at least partially, within the main memory 404 and/or within the processor 402 during execution thereof by the computer system 400, the main memory 404 and the processor 402 also constituting computer-readable media. Instructions 401 may further be transmitted or received over a network via the network interface device 422.

While the computer-readable storage medium 424 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "identifying", "providing", "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    establishing, by a processing device, a process execution component layer comprising a process registry component, a process instance identification component, a first process execution component and a plurality of additional process execution components;
    receiving, by the process registry component, an event message from a client application, wherein the event message comprises event information identifying an event to be performed by a process instance on behalf of the client application;
    sending, by the process registry component, an event identifier message to the process instance identification component, wherein the event identifier message comprises the event information and a target process definition identifier;
    identifying, by the process instance identification component, a process instance in view of the event information and the target process definition identifier;
    providing, by the process instance identification component, a process instance message to the first process execution component executed by the processing device;
    identifying, by the first process execution component executed by the processing device, a process definition in view of the process instance message;
    obtaining, by the first process execution component executed by the processing device, state information associated with the process instance from a memory associated with the processing device;
    generating, by the first process execution component executed by the processing device, a result associated with the event in view of the state information and the process definition; and
    providing, by the first process execution component executed by the processing device, the result to the client application.

2. The method of claim 1, further comprising selecting, by the processing device, the process instance identification component from a plurality of process instance identification components in view of a routing parameter.

3. The method of claim 1, wherein the process instance message is provided to the first process execution component of the process execution component layer in view of a routing parameter.

4. The method of claim 1, further comprising:
    storing a first version of the state information in association with identifying information;
    receiving a new state information message comprising second state information; and
    determining the first version of state information is modified by comparing the identifying information associated with the first version of the state information and the second state information.

5. The method of claim 1, wherein the first process execution component selects the memory comprising a consistent image store component from a plurality of available consistent image store components in a consistent image store component layer.

6. A non-transitory computer readable storage medium comprising instructions that, when executed by a processing device, cause the processing device to:
    establish, by the processing device, a process execution component layer comprising a process registry component, a process instance identification component, a first process execution component and a plurality of additional process execution components;
    receive, by the process registry component, an event message from a client application, wherein the event message comprises event information identifying an event to be performed by a process instance on behalf of the client application;
    send, by the process registry component, an event identifier message to the process instance identification component, wherein the event identifier message comprises the event information and a target process definition identifier;
    identify, by the process instance identification component, a process instance in view of the event information and the target process definition identifier;
    provide, by the process instance identification component, a process instance message to the first process execution component executed by the processing device;
    identify, by the first process execution component executed by the processing device, a process definition in view of the process instance message;
    obtain state information associated with the process instance from a memory associated with the processing device;
    generate, by the first process execution component, a result associated with the event in view of the state information and the process definition; and
    provide, by the first process execution component, the result the client application.

7. The non-transitory computer readable storage medium of claim 6, the processing device to select the process instance identification component from a plurality of process instance identification components in view of a routing parameter.

8. The non-transitory computer readable storage medium of claim 6, wherein the process instance message is provided to the first process execution component of the process execution component layer in view of a routing parameter.

9. The non-transitory computer readable storage medium of claim 6, the processing device to:
    store a first version of the state information in association with identifying information;

receive a new state information message comprising second state information; and determine the first version of state information is modified by comparing the identifying information associated with the first version of the state information and the second state information.

10. The non-transitory computer readable storage medium of claim 6, wherein the first process execution component selects the memory comprising a consistent image store component from a plurality of available consistent image store components in a consistent image store component layer.

11. A computer system comprising:
a memory to store instructions; and
a processing device operatively coupled to the memory, the processing device to execute the instructions to:
establish a process execution component layer comprising a process registry component, a process instance identification component, a first process execution component and a plurality of additional process execution components;
receive, by the process registry component, an event message from a client application, wherein the event message comprises event information identifying an event to be performed by a process instance on behalf of the client application;
send, by the process registry component, an event identifier message to the process instance identification component, wherein the event identifier message comprises the event information and a target process definition identifier;
identify, by the process instance identification component, a process instance in view of the event information and the target process definition identifier;
provide, by the process instance identification component, a process instance message to the first process execution component executed by the processing device;
identify, by the first process execution component executed by a processing device, a process definition in view of the process instance message;
obtain, by the first process execution component, state information associated with the process instance from a memory associated with the processing device;
generate, by the first process execution component, a result associated with the event in view of the state information and the process definition; and
provide, by the first process execution component, the result to the client application.

12. The system of claim 11, wherein the process instance identification component is selected from a process instance identification component layer in view of a routing parameter.

13. The system of claim 11, the processing device to:
store a first version of the state information in association with identifying information;
receive a new state information message comprising second state information; and
determine the first version of state information is modified by comparing the identifying information associated with the first version of the state information and the second state information.

14. The system of claim 11, wherein the first process execution component selects the memory comprising a consistent image store component from a plurality of consistent image store component layers in view of a routing parameter.

* * * * *